: 3,157,523
MANGANESE OXIDE CERAMICS AND METHODS FOR THEIR PREPARATION

Gerhard Bayer, Obere Halden, Hinteregg, Zurich, Switzerland, assignor to Owens-Illinois Glass Company, a corporation of Ohio
No Drawing. Filed July 3, 1961, Ser. No. 121,344
4 Claims. (Cl. 106—65)

This invention relates to sintered manganese oxide ($Mn_3O_4$) ceramics and to methods for their preparation. In another aspect, the invention relates to a method for controlling the change of dimensions and porosity in the preparation of $Mn_3O_4$-alumina ceramics. In another aspect of the invention, it relates to a method of making a porous $Mn_3O_4$-alumina ceramic by sintering while obtaining substantially no shrinkage or a slight expansion during the sintering process. In another specific aspect, the invention relates to porous sintered $Mn_3O_4$-alumina ceramics containing 7–20 weight percent alumina.

Pure $Mn_3O_4$ ceramics when made by compacting powdered $Mn_3O_4$ and sintering undergoes great shrinkage and forms a substantially nonporous body. This shrinkage is a disadvantage in attempting to form ceramic shapes of $Mn_3O_4$ of a final desired configuration from the compacted unsintered powders.

It is therefore one object of the invention to provide a method for controlling the shrinkage of $Mn_3O_4$ ceramics during sintering. Another object is to provide new $Mn_3O_4$-alumina ceramics. A further object is to provide a method to control the porosity of $Mn_3O_4$-alumina sintered ceramics. Another object is to provide porous $Mn_3O_4$-alumina ceramics and a method for making the same.

Other objects, as well as aspects and advantages, of the invention will become apparent from a study of the specification.

The new ceramics of the invention are prepared by intimately admixing 99 to 80 parts by weight of $Mn_3O_4$ and 1 to 20 parts by weight of $Al_2O_3$, compacting the admixture and thereafter heat sintering the compacted mixture in an oxidizing (free oxygen-containing) atmosphere. The starting manganese compound need not necessarily be $Mn_3O_4$ but can also be a manganese compound which is convertible in situ to $Mn_3O_4$ under the conditions of sintering. Temperatures employed in the sintering step are from 1200 to about 1500° C.

Thus, instead of $Mn_3O_4$, one can start with MnO, $Mn_2O_3$ or $MnO_2$ since $Mn_3O_4$ is the only stable manganese oxide at temperatures above 900° C. in an oxidizing atmosphere, and it does not reoxidize to $Mn_2O_3$ or $MnO_2$ upon cooling down to room temperature. As another example $MnCO_3$ can be the starting material, since it is decomposed and converted to $Mn_3O_4$ under the above sintering conditions. Similarly, decomposable salts such as $MnSO_4$ can be employed. However, it is usually preferred to use either $Mn_3O_4$ or one of the other solid manganese oxides as the starting material in the compacting step.

In the following examples $Mn_3O_4$ and $Al_2O_3$ of particle size below 60 microns were employed as the starting materials. The $Mn_3O_4$ was prepared by heating $MnCO_3$ at 1000° C. The ceramics were prepared by intimately admixing the powders in the desired percentages and compacting the mixture at a pressure of 500 kg./cm.$^2$, followed by sintering in an air atmosphere for 10 hours at 1380° C., then cooling to room temperature.

Example I

The ceramic of this example was a sintered mixture of one weight percent alumina and 99 weight percent $Mn_3O_4$. The ceramic piece had a linear shrinkage of 16.5% on sintering, and was substantially nonporous. A similarly compacted and sintered ceramic of pure $Mn_3O_4$ had a shrinkage of 21.5% and was substantially nonporous.

Example II

Another ceramic was prepared as in Example I but using 5 weight percent alumina and 95 weight percent $Mn_3O_4$. The linear shrinkage was 15.5 weight percent and the sintered ceramic was substantially nonporous.

Example III

The ceramic of this example was prepared as in Example I except that 10 wight percent of alumina and 90 weight percent $Mn_3O_4$ were used. The resulting ceramic did not shrink during sintering but exhibited a linear expansion of 2.5%. It was also highly porous. This porosity was indicated by the following test. A drop of distilled water (0.03 cc.) was placed from a height of 10 mm. on the surface of a 20 mm. diameter disc of the ceramic. In one second the drop was absorbed completely.

Example IV

Example III was repeated except that 20 weight percent alumina and 80 weight percent $Mn_3O_4$ were employed. This ceramic exhibited a linear expansion of 5.5 weight percent during formation. It was also highly porous.

From the foregoing, it will be appreciated that there is provided a method for controlling the change of dimensions and porosity of $Mn_3O_4$-alumina sintered ceramics, which method comprises sintering a compacted powdered intimate admixture of $Mn_3O_4$ and $Al_2O_3$ at a temperature in the range from 1200 to about 1500° C. in an oxidizing atmosphere and varying the amount of $Al_2O_3$ within the range from 1 to 20 weight percent in accordance with the shrinkage or expansion desired, the shrinkage decreasing with increasing amounts of $Al_2O_3$.

The exact shrinkage obtained according to the invention is also dependent in part on a number of factors, including time and temperature of sintering and the particle size of the $Mn_3O_4$ and $Al_2O_3$. However, every other condition being held the same, the effect of alumina content is a very large factor in determining the linear shrinkage.

In the process of the invention the powdered raw materials desirably are below 200 microns particle size, preferably below 80 microns.

In making the porous ceramics of the invention from about 7 to 20 parts by weight percent of alumina are used to about 80 to 93 parts by weight percent of $Mn_3O_4$ as the starting material.

In one aspect of the invention a method is provided for producing, by sintering, a porous $Mn_3O_4$–$Al_2O_3$ ceramic whereby substantially no expansion or shrinkage is obtained as a result of said sintering step. This method comprises heating $Al_2O_3$ and $Mn_3O_4$ powders in compacted intimate admixture at a sintering temperature in the range from 1200° C. to about 1500° C. in the oxidizing atmosphere and using a ratio of $Al_2O_3$ to $Mn_3O_4$ within the range from about 7/93 to about 10/90. It will be understood that the exact percentage of alumina employed to obtain substantially zero dimensional change depends on the other factors mentioned, i.e., state of subdivision and the particular time and temperature of sintering. However, the exact percentage can be determined from a series of routine tests, as will be readily understood.

Although the exact constitution of the present ceramics in their heat reacted form is not known, it is probable that at least some compound is formed between the starting materials. This could account for the unusual change of shrinkage with increasing percentages of alumina.

Times of sintering at the temperatures in the range from 1200° C. to about 1500° C. range usually from 1 to 20 hours. Usually the maximum sintering temperature is held within the narrower temperature range from 1300° C. to 1450° C.

The present ceramics are generally useful where high temperature resistant ceramics and refractories are conventionally employed. However, the porous ceramics of the invention are especially useful as filters and diaphragms for alkaline solutions, having superior chemical resistance to such materials. The process for obtaining porous ceramics with little or no dimensional change is useful in obtaining articles of very accurate dimensions without need for subsequent machining. The dense or substantially nonporous ceramic products are useful refractories for steam regenerators for recovering heat from high temperature process gases. In combination with the porous ceramics of the invention excellent filters can be constructed with resistance to alkaline solution.

As will be evident to those skilled in the art, various modifications of this invention can be made or followed in the light of the foregoing disclosure and discussion without departing from the spirit and scope of the disclosure or from the scope of the claims.

I claim:

1. A ceramic product made by sintering a compacted intimate admixture consisting essentially of particulate alumina and a particulate manganese compound at a sintering temperature in the range from 1200 to about 1500° C., in a free oxygen-containing oxidizing atmosphere, said manganese compound being selected from the group consisting of $Mn_3O_4$ and a compound convertible to $Mn_3O_4$ under the conditions of sintering, the ratio of $Al_2O_3$ to manganese compound being such that the ratio of $Al_2O_3$ to $Mn_3O_4$ equivalent of said manganese compound is from 1/99 to 1/4.

2. A porous ceramic product according to claim 1 wherein said ratio is from 7/93 to 1/4.

3. A method of making, by sintering, a porous $Mn_3O_4$–$Al_2O_3$ ceramic whereby substantially no dimensional change occurs as a result of sintering step, which comprises heating a composition consisting essentially of intimately admixed and compacted powders of $Al_2O_3$ and $Mn_3O_4$ at a sintering temperature in the range from 1200° C. to about 1500° C. in free oxygen-containing oxidizing atmosphere, the ratio of $Al_2O_3$ to $Mn_3O_4$ being in the range from about 7/93 to about 10/90.

4. A method of making $Mn_3O_4$-alumina sintered ceramics so as to control the change of dimensions and porosity thereof which comprises sintering a compacted powdered intimate admixture consisting essentially of $Mn_3O_4$ and $Al_2O_3$ at a temperature in the range from 1200 to about 1500° C. in a free oxygen-containing oxidizing atmosphere with a ratio of alumina to $Mn_3O_4$ being in the range from 1/99 to 1/4 in accordance with the type and degree of dimensional change desired.

References Cited in the file of this patent

UNITED STATES PATENTS 2,152,656     McDougal et al. ---------- Apr. 4, 1939